US011283506B2

(12) United States Patent
Lee et al.

(10) Patent No.: US 11,283,506 B2
(45) Date of Patent: Mar. 22, 2022

(54) METHOD FOR TRANSMITTING AND RECEIVING PHASE TRACKING REFERENCE SIGNAL BETWEEN TERMINAL AND BASE STATION IN WIRELESS COMMUNICATION SYSTEM, AND DEVICE FOR SUPPORTING SAME

(71) Applicant: LG ELECTRONICS INC., Seoul (KR)

(72) Inventors: Kilbom Lee, Seoul (KR); Jiwon Kang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/955,291

(22) PCT Filed: Jan. 7, 2019

(86) PCT No.: PCT/KR2019/000209
§ 371 (c)(1),
(2) Date: Jun. 18, 2020

(87) PCT Pub. No.: WO2019/135650
PCT Pub. Date: Jul. 11, 2019

(65) Prior Publication Data
US 2020/0395988 A1 Dec. 17, 2020

Related U.S. Application Data

(60) Provisional application No. 62/614,486, filed on Jan. 7, 2018.

(51) Int. Cl.
H04B 7/06 (2006.01)
H04L 1/00 (2006.01)

(52) U.S. Cl.
CPC ......... H04B 7/0626 (2013.01); H04B 7/0639 (2013.01); H04L 1/0026 (2013.01)

(58) Field of Classification Search
CPC .... H04B 7/0626; H04B 7/0639; H04L 1/0026
See application file for complete search history.

(56) References Cited

U.S. PATENT DOCUMENTS

2011/0019776 A1    1/2011  Zhang et al.
2013/0114455 A1*   5/2013  Yoo ..................... H04W 72/082
                                                            370/252

(Continued)

FOREIGN PATENT DOCUMENTS

WO    2017200315 A1    11/2017

OTHER PUBLICATIONS

R1-1721451: 3GPP TSG-RAN WG1 #91, Reno, USA, Nov. 27-Dec. 1, 2017, "Summary of views on CSI Reporting," Ericsson, (11 Pages).

(Continued)

Primary Examiner — Freshteh N Aghdam
(74) Attorney, Agent, or Firm — Dentons US LLP

(57) ABSTRACT

The present invention provides a method for receiving, by a terminal, a downlink phase tracking reference signal from a base station in a wireless communication system, and a device for supporting the same. According to an embodiment applicable to the present invention, a terminal may receive, from a base station, a phase tracking reference signal on the basis of the number of phase tracking reference signal ports, which is determined on the basis of different methods, according to whether transmission configuration indication (TCI) state-related information exists in received downlink control information. Further, the base station may transmit the phase tracking reference signal to the terminal accordingly.

12 Claims, 12 Drawing Sheets

(56) References Cited

U.S. PATENT DOCUMENTS

| | | | | |
|---|---|---|---|---|
| 2014/0254508 | A1* | 9/2014 | Krishnamurthy | H04B 7/0452 370/329 |
| 2014/0369244 | A1* | 12/2014 | Han | H04L 65/60 370/280 |
| 2015/0201429 | A1* | 7/2015 | Chen | H04W 72/1242 370/329 |
| 2016/0156447 | A1* | 6/2016 | Kim | H04L 5/001 370/329 |
| 2016/0164589 | A1* | 6/2016 | Han | H04L 5/0057 370/329 |
| 2017/0353976 | A1* | 12/2017 | Yerramalli | H04L 5/0057 |
| 2018/0076924 | A1* | 3/2018 | Lee | H04L 1/0026 |
| 2018/0375619 | A1* | 12/2018 | Hwang | H04W 72/0446 |
| 2020/0366357 | A1* | 11/2020 | Chen | H04B 7/0639 |
| 2021/0111853 | A1* | 4/2021 | Onggosanusi | H04W 72/0446 |

OTHER PUBLICATIONS

R1-1721378: 3GPP TSG-RAN WG1 #91, Reno, USA, Nov. 27-Dec. 1, 2017, "Summary of views on CSI reporting," Ericsson, (9 Pages).

R1-1720586: 3GPP TSG RAN WG1 Meeting 90bis, Reno, USA, Nov. 27-Dec. 1, 2017, CMCC, "Discussion on remaining issues for beam management", (3 Pages).

R1-1719543: 3GPP TSG RAN WG1 Meeting #91, Reno, USA, Nov. 27-Dec. 1, 2017, ZTE, Sanechips, Remaining Details on PT-RS, (8 Pages).

R1-1721626: PowerPoint Presentation, WF on PTRS, Huawei, HiSilicon, ZTE, Sanechips, Spreadtrum, vivo, Intel, NEC, ASTRI, NTT DOCOMO, (4 Pages).

* cited by examiner

FIG. 8

| Configuration type 1<br>CDM-T & CDM-F | Configuration type 2<br>CDM-T & CDM-F |
|---|---|
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |

(a)

(b)

METHOD FOR TRANSMITTING AND RECEIVING PHASE TRACKING REFERENCE SIGNAL BETWEEN TERMINAL AND BASE STATION IN WIRELESS COMMUNICATION SYSTEM, AND DEVICE FOR SUPPORTING SAME

This application is the National Stage filing under 35 U.S.C. 371 of International Application No. PCT/KR2019/000209, filed on Jan. 7, 2019, which claims the benefit of U.S. Provisional Applications No. 62/614,486, filed on Jan. 7, 2018, the contents of which are all hereby incorporated by reference herein in their entirety.

TECHNICAL FIELD

The present disclosure relates to a wireless communication system, and more particularly, to a method of transmitting and receiving a downlink phase tracking reference signal (PT-RS) between a terminal and a base station in a wireless communication system and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

In particular, since a method of transmitting a signal in various frequency bands are required, the concept of a phase tracking reference signal (PT-RS) for estimating phase noise between a terminal and a base station in the various frequency bands is discussed in various ways.

DISCLOSURE

Technical Problem

The object of the present disclosure is to provide a method of transmitting and receiving a downlink phase tracking reference signal (PT-RS) between a terminal and a base station in a wireless communication system and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of transmitting and receiving a downlink phase tracking reference signal (PT-RS) between a terminal (user equipment) and a base station in a wireless communication system and devices for supporting the same.

In an aspect of the present disclosure, provided is a method of receiving a PT-RS by a user equipment (UE) in a wireless communication system. The method may include: receiving, from a base station, a physical downlink control channel (PDCCH) including downlink control information (DCI); depending on whether there is information related to a first transmission configuration indication (TCI) state in the DCI, determining the number of downlink PT-RS ports scheduled for the UE based on the first TCI state or a second TCI state applied to a control resource set (CORESET) for receiving the PDCCH; and receiving the PT-RS from the base station based on the determined number of downlink PT-RS ports.

When the determined number of downlink PT-RS ports is 1, the UE may receive the PT-RS from one demodulation reference signal (DMRS) port among one or more DMRS port groups configured for the UE.

In this case, the number of the one or more DMRS port groups configured for the UE may be equal to the number of pieces of reference signal (RS) set information included in the first or second TCI state.

When the determined number of downlink PT-RS ports is 1, the UE may receive the PT-RS from one DMRS port group related to a codeword with a high modulation and coding scheme (MCS) level among a plurality of DMRS port groups configured for the UE.

When the determined number of downlink PT-RS ports is 2, the UE may receive the PT-RS from each of two DMRS port groups configured for the UE.

In this case, a layer on which the UE receives the PT-RS from each of the DMRS port groups may be determined based on a strongest layer indicator (SLI) related to each of the DMRS port groups reported by the UE to the base station.

To this end, the UE may perform joint encoding of SLIs related to the DMRS port groups and report the joint-encoded SLIs to the base station over a physical uplink control channel (PUCCH) with a length of one or two symbols or a PUCCH with a length of four or more symbols with wideband reporting.

Each of the SLI related to a first DMRS port group and the SLI related to a second DMRS port group may have a size of two bits.

The UE may divide each of the SLI related to the first DMRS port group and the SLI related to the second DMRS port group into channel state information (CSI) part 1 and CSI part 2 and reports the CSI part 1 and the CSI part 2 to the base station over a physical uplink shared channel (PUSCH) or a PUCCH with a length of four or more symbols with subband reporting.

The CSI part 1 may further include a CSI reference signal indicator and a rank indicator, and the CSI part 2 may further include a precoding matric indicator.

The SLI related to the first DMRS port group may have a size of two bits, and the SLI related to the second DMRS port group may have a variable bit size depending on the rank of the second DMRS port group.

When the rank of the second DMRS port group is 1, the SLI related to the second DMRS port group may have a size of zero bits. When the rank of the second DMRS port group is 2, the SLI related to the second DMRS port group may have a size of one bit. When the rank of the second DMRS port group is 3 or 4, the SLI related to the second DMRS port group may have a size of two bits.

In another aspect of the present disclosure, provided is a UE for receiving a PT-RS in a wireless communication system. The UE may include a receiver and a processor connected to the receiver. The processor may be configured to: receive, from a base station, a PDCCH including DCI; depending on whether there is information related to a first TCI state in the DCI, determine the number of downlink PT-RS ports scheduled for the UE based on the first TCI state or a second TCI state applied to a CORESET for receiving the PDCCH; and receive the PT-RS from the base station based on the determined number of downlink PT-RS ports.

In still another aspect of the present disclosure, provided is a method of transmitting a PT-RS by a base station to a UE in a wireless communication system. The method may include: transmitting, to the UE, a PDCCH including DCI; and transmitting the PT-RS to the UE. Depending on whether there is information related to a first TCI state in the DCI, the number of downlink PT-RS ports for transmitting the PT-RS may be determined based on the first TCI state or a second TCI state applied to a CORESET for transmitting the PDCCH.

In a further aspect of the present disclosure, provided is a base station for transmitting a PT-RS in a wireless communication system. The base station may include a transmitter and a processor connected to the processor. The processor may be configured to: transmit, to a UE, a PDCCH including DCI; and transmit the PT-RS to the UE. Depending on whether there is information related to a first TCI state in the DCI, the number of downlink PT-RS ports for transmitting the PT-RS may be determined based on the first TCI state or a second TCI state applied to a CORESET for transmitting the PDCCH.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, even when a UE fails to receive information on a transmission resource (or beam) for a downlink phase tracking reference signal (PT-RS) in downlink control information (DCI), the UE may receive the downlink PT-RS. In other words, a base station may transmit the downlink PT-RS to the UE without transmitting the information on the transmission resource (or beam) for the downlink PT-RS in the DCI.

When the UE is configured with one or more demodulation reference signal (DMRS) port groups, the UE may efficiently report information on the best layer for each DMRS port group to the BS in terms of resources. For example, according to the present disclosure, when two DMRS port groups are configured, information about the best layer for the second DMRS port group may have a variable bit size depending on the rank of the second DMRS port group.

The effects that may be achieved through the embodiments of the present disclosure are not limited to what has been particularly described hereinabove and other effects which are not described herein may be derived by those skilled in the art from the following detailed description. That is, it should be noted that effects which are not intended by the present disclosure may be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 8 is a diagram schematically illustrating two demodulation reference signal (DMRS) configuration types applicable to the present disclosure.

BEST MODE

Figure 1:
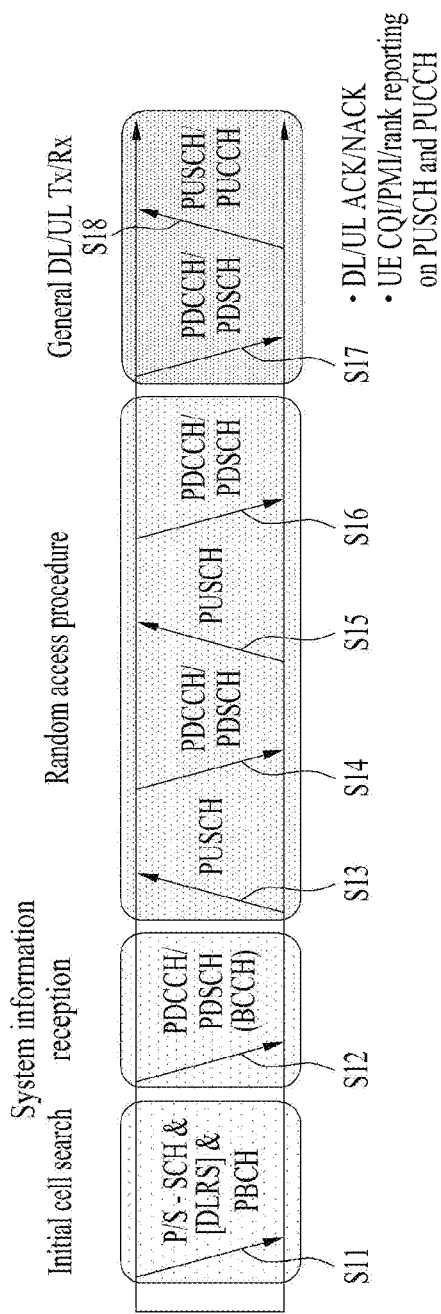
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end may refer to a fixed and/or mobile node that provides data or voice services, and a reception end may refer to a fixed and/or mobile node that receives data or voice services. Thus, in uplink (UL) transmission, the UE and the BS may act as the transmission end and the reception end, respectively. In downlink (DL) transmission, the UE and the BS may act as the reception end and the transmission end, respectively.

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which is an example of wireless access system.

The embodiments of the present disclosure may be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

While the embodiments of the present disclosure are described based on the 3GPP NR system in order to clarify the technical features of the present disclosure, the present disclosure is also applicable to other radio systems (e.g., 3GPP LTE, IEEE 802.16, IEEE 802.11, etc.).

1. NR System 1.1. Physical Channels and Signal Transmission and Reception Method Using the Same In a wireless access system, a UE receives information from a BS in DL and transmits information to the BS in UL. The information transmitted and received between the UE and BS includes general data information and various types of control information. There are many physical channels depending on the types/usages of information transmitted and received between the UE and BS.

FIG. 1 illustrates physical channels and a general signal transmission method using the physical channels, which are applicable to the embodiments of the present disclosure.

When a UE is powered on or enters a new cell, the UE performs an initial cell search (S11). The initial cell search involves acquisition of synchronization to a BS. Specifically, the UE synchronizes its timing with the BS and obtains information such as a cell Identifier (ID) by receiving a primary synchronization channel (P-SCH) and a secondary synchronization channel (S-SCH) from the BS.

Then, the UE may obtain information broadcast in the cell by receiving a physical broadcast channel (PBCH) from the BS.

During the initial cell search, the UE may monitor the state of a DL channel by receiving a DL reference signal (RS).

After completing the initial cell search, the UE may obtain more detailed system information by receiving a physical downlink control channel (PDCCH) and a physical downlink shared channel (PDSCH), which depends on information in the PDCCH (S12).

To complete access to the BS, the UE may perform a random access procedure (S13 to S16). To this end, the UE may transmit a preamble over a physical random access channel (PRACH) (S13) and receive a random access response (RAR) for the preamble over the PDCCH and the PDSCH associated therewith (S14). The UE may transmit a physical uplink shared channel (PUSCH) based on scheduling information in the RAR (S15). The UE may perform a contention resolution procedure by receiving a PDCCH signal and a PDSCH signal associated therewith.

After completing the above procedure, the UE may perform reception of a PDCCH signal and/or a PDSCH signal (S17) and transmission of a physical uplink control channel (PUCCH) signal and a PUSCH signal (S18) as a general UL/DL signal transmission procedure.

Control information transmitted from the UE to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix indicator (PMI), a rank indicator (RI), etc.

In general, the UCI may be periodically transmitted over the PUCCH in the NR system. However, in some embodiments, the UCI may be transmitted on the PUSCH (if control information and traffic data need to be transmitted simultaneously). In addition, when receiving a request/command from a network, a UE may aperiodically transmit the UCI over the PUSCH.

1.2 Numerologies

The NR system to which the present disclosure is applicable supports various orthogonal frequency division multiplexing (OFDM) numerologies shown in the following table. In this case, the value of μ and cyclic prefix information per carrier bandwidth part may be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

1.3 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing p, slots may be numbered within one subframe in ascending order like $n_s^\mu \in \{0, \ldots, N_{symb}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 2 shows the number of OFDM symbols in each slot/frame/subframe in the case of the normal cyclic prefix, and Table 3 shows the number of OFDM symbols in each slot/frame/subframe in the case of the extended cyclic prefix.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure is applicable, a self-contained slot structure may be applied based on the above-described slot structure.

Figure 2:
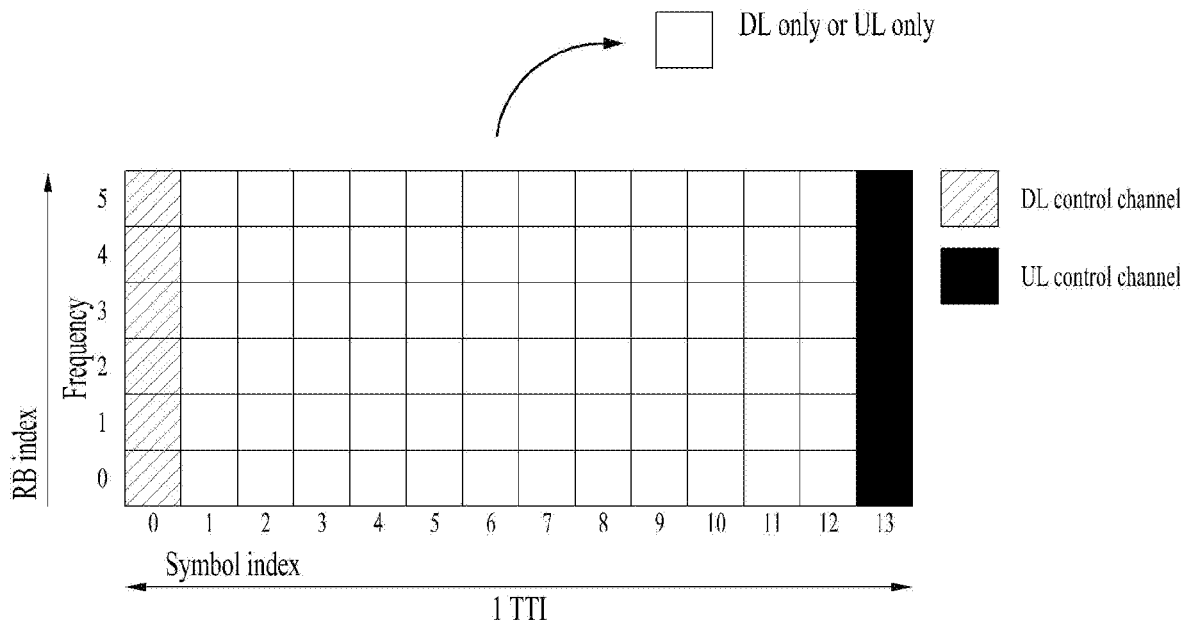
FIG. 2 is a diagram illustrating a self-contained subframe structure applicable to the present disclosure.

FIG. 2 is a diagram illustrating a self-contained slot structure applicable to the present disclosure.

In FIG. 2, the hatched area (e.g., symbol index=0) indicates a downlink control region, and the black area (e.g., symbol index=13) indicates an uplink control region. The remaining area (e.g., symbol index=1 to 13) may be used for DL or UL data transmission.

Based on this structure, the BS and UE may sequentially perform DL transmission and UL transmission in one slot. That is, the BS and UE may transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of time gap is required for the process of allowing the BS and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 2.

In addition, for example, the slot may have various slot formats. In this case, OFDM symbols in each slot may be divided into downlink symbols (denoted by 'D'), flexible symbols (denoted by 'X'), and uplink symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

1.4. Analog Beamforming

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 3:
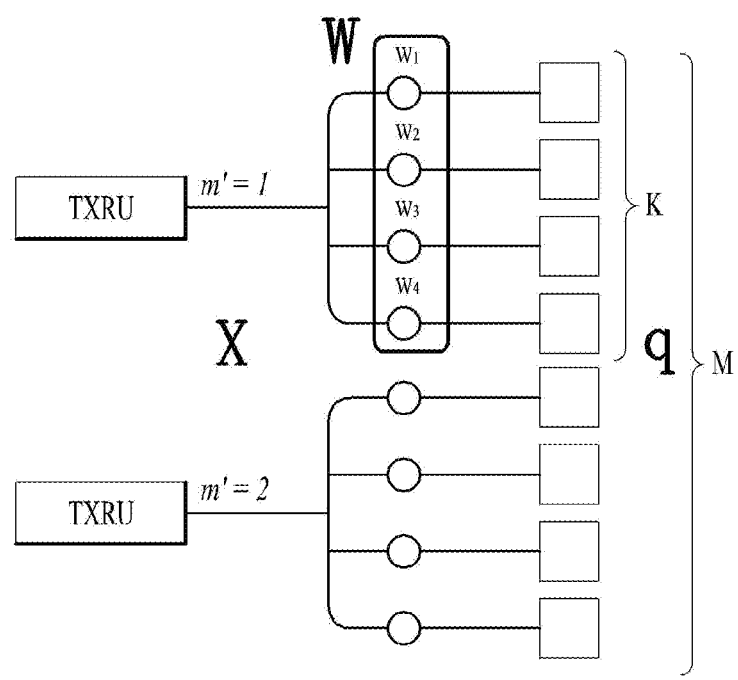
FIGS. 3 and 4 are diagrams illustrating representative methods for connecting transceiver units (TXRUs) to antenna elements.
Figure 4:
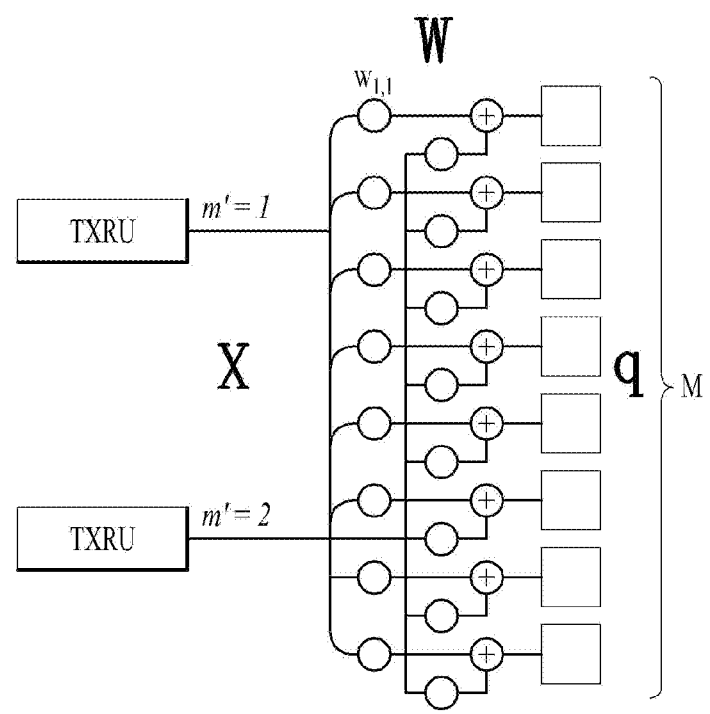

FIGS. 3 and 4 are diagrams illustrating representative methods for connecting TXRUs to antenna elements. Here, the TXRU virtualization model represents the relationship between TXRU output signals and antenna element output signals.

Figure 7:
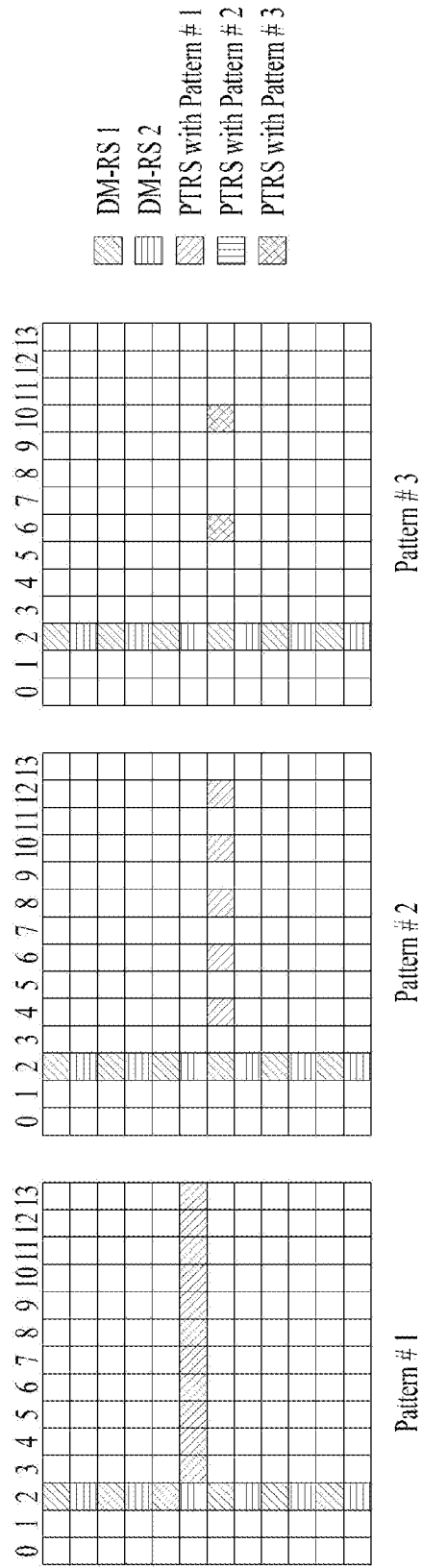
FIG. 7 is a diagram illustrating phase tracking reference signal (PT-RS) time-domain patterns applicable to the present disclosure.

FIG. 3 shows a method for connecting TXRUs to sub-arrays. In FIG. 7, one antenna element is connected to one TXRU.

Meanwhile, FIG. 4 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 3 and 4, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 3 has a disadvantage in that it is difficult to achieve beamforming focusing but has an advantage in that all antennas may be configured at low cost.

On the contrary, the configuration shown in FIG. 4 is advantageous in that beamforming focusing may be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming may be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees performance similar to that of the digital beamforming while reducing the number of RF chains and the number of D/A (digital-to-analog) (or A/D (analog-to-digital)) converters.

For convenience of description, the hybrid beamforming structure may be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 5:
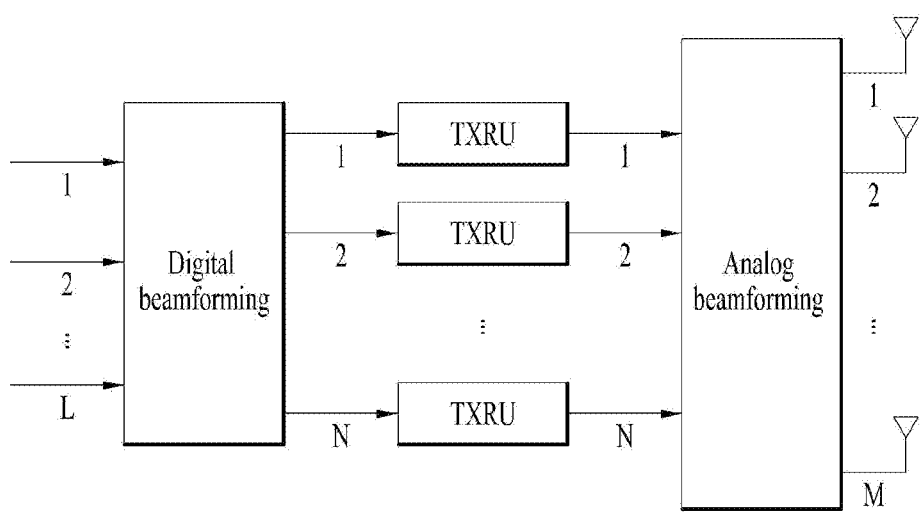
FIG. 5 is a schematic diagram illustrating a hybrid beamforming structure according to an embodiment of the present disclosure from the perspective of TXRUs and physical antennas.

FIG. 5 is a schematic diagram illustrating a hybrid beamforming structure according to an embodiment of the present disclosure from the perspective of TXRUs and physical antennas. In FIG. 5, it is assumed that the number of digital beams is L and the number of analog beams is N.

Additionally, a method for providing efficient beamforming to UEs located in a specific area by designing a BS capable of changing analog beamforming on a symbol basis has been considered in the NR system to which the present disclosure is applicable. Further, a method of introducing a plurality of antenna panels where independent hybrid beamforming may be applied by defining N TXRUs and M RF antennas as one antenna panel has also been considered in the NR system to which the present disclosure is applicable.

When the BS uses a plurality of analog beams as described above, each UE has a different analog beam suitable for signal reception. Thus, the beam sweeping operation where the BS applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 6:
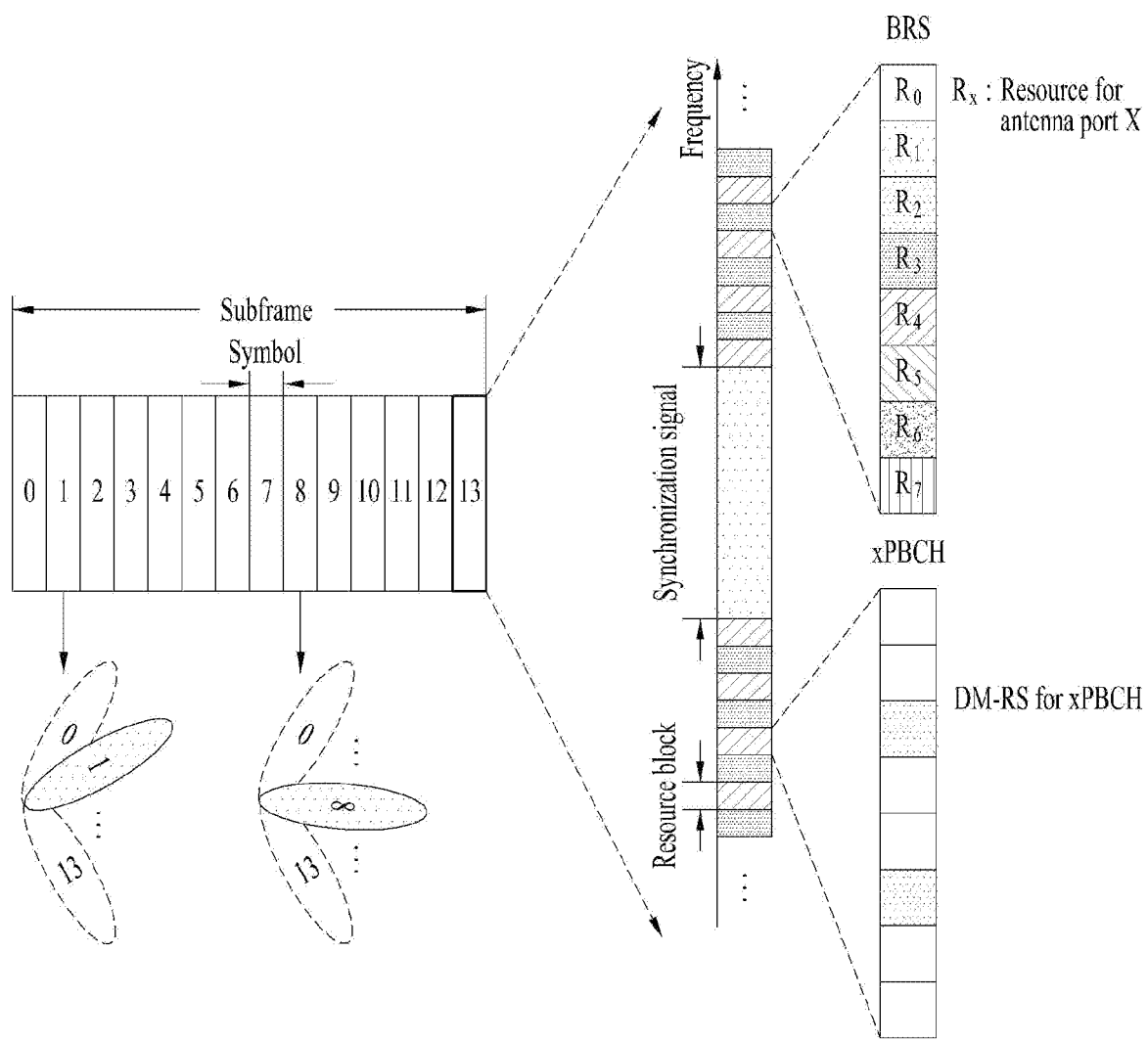
FIG. 6 is a diagram schematically illustrating beam sweeping operation for synchronization signals and system information during a downlink (DL) transmission process according to an embodiment of the present disclosure.

FIG. 6 is a diagram schematically illustrating the beam sweeping operation for synchronization signals and system information during a downlink (DL) transmission process according to an embodiment of the present disclosure In FIG. 6, a physical resource (or channel) for transmitting system information of the NR system to which the present disclosure is applicable in a broadcasting manner is referred to as a physical broadcast channel (xPBCH). In this case, analog beams belonging to different antenna panels may be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS may be defined for a plurality of antenna ports, and each BRS antenna port may correspond to a single analog beam. In this case, unlike the BRS, all analog beams in the analog beam group may be applied to the synchronization signal or xPBCH unlike the BRS to assist a random UE to correctly receive the synchronization signal or xPBCH.

1.5. PT-RS (Phase Tracking Reference Signal)

Hereinafter, phase noise will be described. Jitter, which occurs in the time domain, may appear as phase noise in the frequency domain. Such phase noise randomly changes the phase of the received signal in the time domain as shown in the following equation.

$$r_n = s_n e^{j\phi_n} \quad \text{[Equation 1]}$$

$$\text{where } s_n = \sum_{k=0}^{N-1} d_k e^{j2\pi \frac{kn}{N}}$$

In Equation 1, the parameters $r_n$, $s_n$, $d_k$, $\phi_n$ indicate a received signal, a time-domain signal, a frequency-domain signal, and a phase rotation value due to phase noise, respectively. When the DFT (discrete Fourier transform) process is applied the received signal in Equation 11, Equation 2 is obtained.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)m/N} \quad \text{[Equation 2]}$$

In Equation 2, the parameters $$\frac{1}{N} \sum_{n=0}^{N-1} e^{j\phi_n}, \frac{1}{N} \sum_{\substack{t=0 \\ t \neq k}}^{N-1} d_t \sum_{n=0}^{N-1} e^{j\phi_n} e^{j2\pi(t-k)m/N}$$

indicate common phase error (CPE) and inter-cell interference (ICI), respectively. In this case, as phase noise correlation increases, the value of the CPE in Equation 12 increases. Such CPE may be considered as a kind of carrier frequency offset in a WLAN system, but from the perspective of the UE, the CPE and CFO could be interpreted as to be similar to each other.

By performing CPE/CFO estimation, the UE may eliminate CPE/CFO corresponding to phase noise in the frequency domain. In addition, to correctly decode a received signal, the UE should perform the CPE/CFO estimation before decoding the received signal. Accordingly, the BS may transmit a certain signal to the UE in order for the UE to perform the CPE/CFO estimation accurately. That is, the main purpose of such a signal is to estimate phase noise. To this end, a pilot signal previously shared between the BS and UE may be used, or a data signal may be changed or duplicated. In this specification, a series of signals for estimating phase noise are commonly called the phase compensation reference signal (PCRS), phase noise reference signal (PNRS), or phase tracking reference signal (PT-RS). Hereinafter, for convenience of description, all of them are referred to as the PT-RS.

1.5.1. Time-Domain Pattern (or Time Density)

FIG. 7 is a diagram illustrating PT-RS time-domain patterns applicable to the present disclosure.

As shown in FIG. 7, the PT-RS may have different patterns depending on the applied modulation and coding scheme (MCS) level

TABLE 4

| MCS level | PT-RS time pattern |
|---|---|
| (64QAM, CR = 1/3) <= MCS < (64QAM, CR = 1/2) | #3 |
| (64QAM, CR = 1/2) <= MCS < (64QAM, CR = 5/6) | #2 |
| (64QAM, CR = 5/6) <= MCS | #1 |

As shown in FIG. 7 and Table 4, the PT-RS mapping pattern may differ according to the applied MCS level.

If this configuration is generalized, the PT-RS time-domain pattern (or time density) may be defined as shown in the following table.

TABLE 5

| Scheduled MCS | Time density ($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

In this case, the time densities of 1, 2, and 4 may correspond to patterns #1, #2, and #3 of FIG. 7, respectively.

In this configuration, ptrs-MCS1, ptrs-MCS2, ptrs-MCS3, and ptrs-MCS4 may be defined through higher layer signaling.

1.5.2 Frequency-Domain Pattern (or Frequency Density)

According to the present disclosure, the PT-RS may be mapped to one subcarrier every one resource block (RB), one subcarrier every two RBs, or one subcarrier every four RBs for transmission thereof. In this case, the frequency-domain pattern (or frequency density) of the PT-RS may be configured according to scheduled bandwidth.

For example, the frequency density may be determined as shown in Table 6 according to the scheduled bandwidth.

TABLE 6

| Scheduled BW | Frequency density |
|---|---|
| 0 < $N_{RB}$ <= 4 | No PT-RS |
| 5 < $N_{RB}$ <= 8 | 1 |
| 9 < $N_{RB}$ <= 16 | 1/2 |
| 17 < $N_{RB}$ <= 32 | 1/4 |

In this case, the frequency density of 1 may correspond to a frequency-domain pattern where the PT-RS is mapped to one subcarrier every RB, the frequency density of ½ may correspond to a frequency-domain pattern where the PT-RS is mapped to one subcarrier every four RBs, and the frequency density of ¼ may correspond to a frequency-domain pattern where the PT-RS is mapped to one subcarrier every four RBs.

If this configuration is generalized, the frequency-domain pattern (or frequency density) of the PT-RS may be defined as shown in the following table.

TABLE 7

| Scheduled bandwidth | Frequency density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

In this case, the frequency density of 2 may correspond to the frequency-domain pattern where the PT-RS is mapped to one subcarrier every two RBs, and the frequency density of 4 may correspond to the frequency-domain pattern where the PT-RS is mapped to one subcarrier every four RBs.

In this configuration, NRB0 and NRB1 may be defined through higher layer signaling.

1.6. DMRS (Demodulation Reference Signal)

In the NR system to which the present disclosure is applicable, a DMRS may be transmitted and received based on a front-load structure. Alternatively, an additional DMRS may be transmitted and received in addition to the front-loaded DMRS.

The front-loaded DMRS may support fast decoding. The first OFDM symbol in which the front-loaded DMRS is loaded may be determined as the third (e.g., 1=2) or fourth (e.g., 1=3) OFDM symbol. The location of the first OFDM symbol may be indicated by a PBCH.

The number of OFDM symbols occupied by the front-loaded DMRS may be indicated by a combination of DCI and radio resource control (RRC) signaling.

The additional DMRS may be configured for a high-speed UE. The additional DMRS may be located at intermediate/last symbol(s) in a slot. When one front-loaded DMRS is configured, the additional DMRS may be allocated to zero to three OFDM symbols. When two front-loaded DMRSs are configured, the additional DMRS may be allocated to zero or two OFDM symbols.

The front-loaded DMRS may be configured to have two types. One of the two types may be indicated by higher layer signaling (e.g., RRC signaling).

FIG. 8 is a diagram schematically illustrating two DMRS configuration types applicable to the present disclosure.

In FIG. 8, P0 to P11 may correspond to port numbers 1000 to 1011, respectively. A DMRS configuration type of the two DMRS configuration types, which is actually configured for a UE, may be indicated by higher layer signaling (e.g., RRC signaling).

In the case of DMRS configuration type 1, it may be subdivided as follows depending on the number of OFDM symbols allocated for the front-loaded DMRS.

DMRS Configuration Type 1 and the Number of OFDM Symbols Allocated for the Front-Loaded DMRS=1

A maximum of four ports (e.g., P0 to P3) may be multiplexed based on length-2 frequency-code division multiplexing (F-CDM) and frequency division multiplexing (FDM). The RS density may be set to four REs per port in an RB.

DMRS Configuration Type 1 and the Number of OFDM Symbols Allocated for the Front-Loaded DMRS=2

A maximum of 8 ports (e.g., P0 to P7) may be multiplexed based on length-2 F-CDM, length-2 time-code division multiplexing (T-CDM), and FDM. The RS density may be set to 6 REs per port in an RB. When the presence of a PT-RS is configured by higher layer signaling, the T-CDM may be fixed to [1 1]. The RS density may be set to 12 REs per port in an RB.

In the case of DMRS configuration type 2, it may be subdivided as follows depending on the number of OFDM symbols allocated for the front-loaded DMRS.

DMRS Configuration Type 2 and the Number of OFDM Symbols Allocated for the Front-Loaded DMRS=1

A maximum of 6 ports (e.g., P0 to P5) may be multiplexed based on length-2 F-CDM and FUM. The RS density may be set to four REs per port in an RB.

DMRS Configuration Type 2 and the Number of OFDM Symbols Allocated for the Front-Loaded DMRS=2

A maximum of 12 ports (e.g., P0 to P11) may be multiplexed based on length-2 F-CDM, length-2 T-CDM, and FDM. The RS density may be set to 6 REs per port in an RB. When the presence of a PT-RS is configured by higher layer signaling, the T-CDM may be fixed to [1 1]. The RS density may be set to 8 REs per port in an RB.

Figure 9:
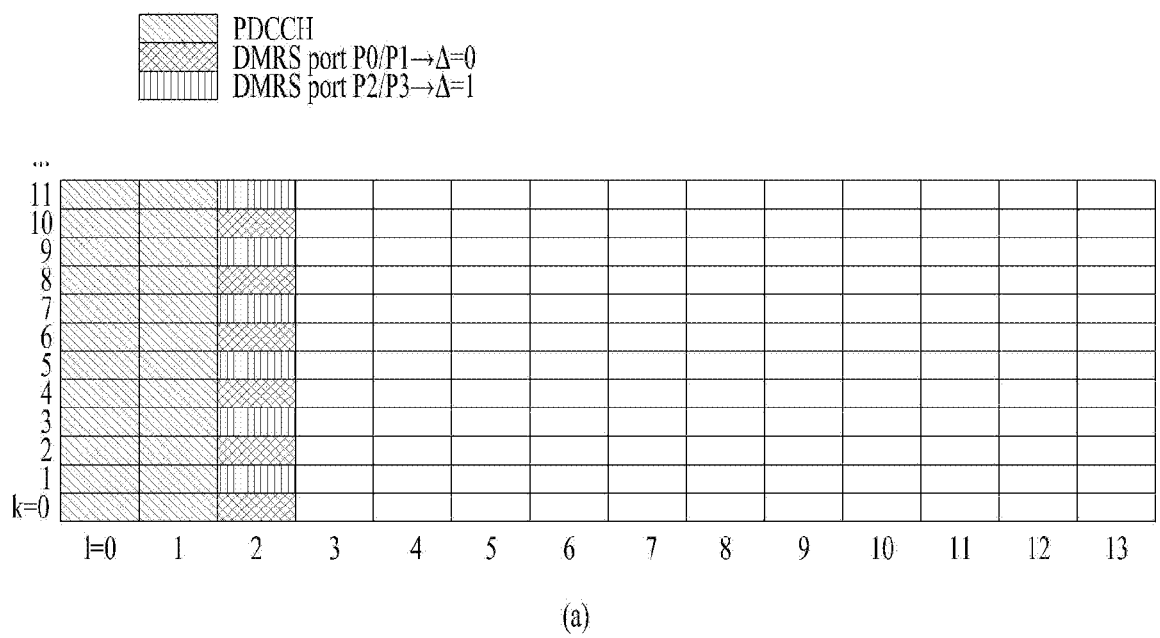
FIG. 9 is a diagram schematically illustrating an example of a first DMRS configuration type of front-loaded DMRS applicable to the present disclosure.
Figure 9:
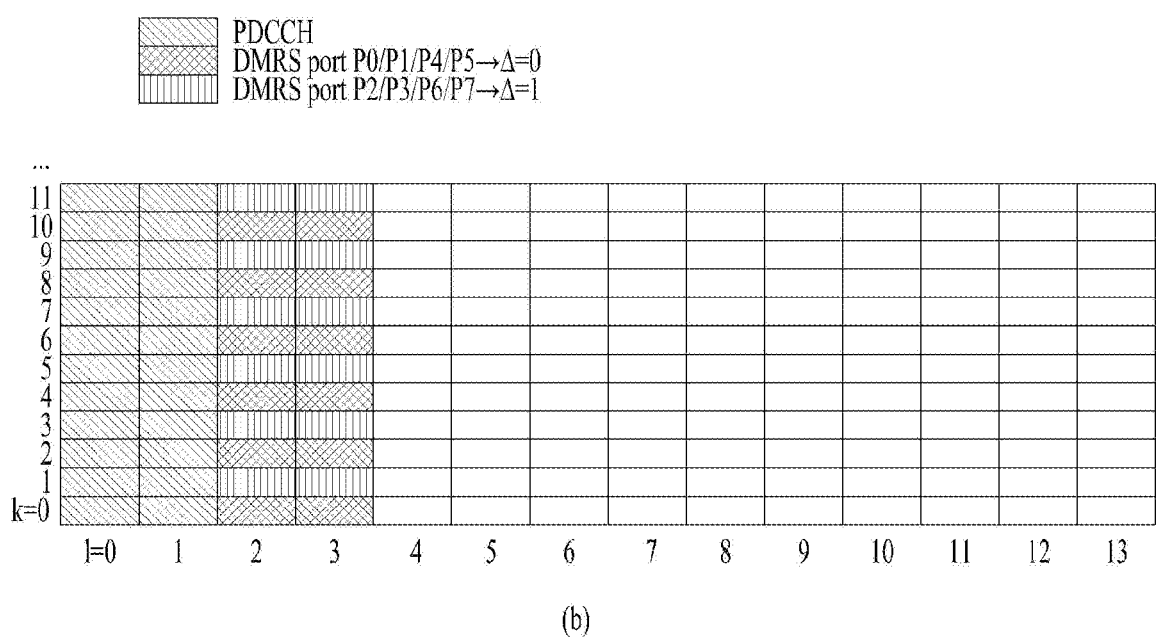

FIG. 9 is a diagram schematically illustrating an example of the first DMRS configuration type of front-loaded DMRS applicable to the present disclosure.

Specifically, FIG. 9 (a) shows a structure where the DMRS is front-loaded in one symbol (front-loaded DMRS with one symbol), and FIG. 9 (b) shows a structure where the DMRS is front-loaded in two symbols (front loaded DMRS with two symbols).

In FIG. 9, $\Delta$ denotes a DMRS offset value in the frequency domain. In this case, DMRS ports with the same value of $\Delta$ may be code division multiplexed in the frequency domain (CDM-F) or code division multiplexed in the time domain (CDM-T). In addition, CDM-F may also be applied to DMRS ports with different values of $\Delta$.

A UE may obtain DM-RS port configuration information configured by a BS from DCI.

1.7. DMRS Port Group

In the present disclosure, a DMRS port group may refer to a set of DMRS ports that are quasi co-located (QCLed) or partially QCLed. Here, quasi co-location (QCL) may mean that long-term channel parameters such as Doppler spread and/or Doppler shift, average delay, delay spread, etc. are assumed to be the same. Partial QCL may mean that some of the long-term channel parameters are assumed to be the same.

1.8. DCI Format in NR System

The NR system to which the present disclosure is applicable may support the following DCI formats. Specifically, the NR system may support DCI format 0_0 and DCI format 0_1 for PUSCH scheduling and support DCI format 1_0 and DCI format 1_1 for PDSCH scheduling. In addition, the NR system may additionally support DCI format 2_0, DCI format 2_1, DCI format 2_2, and DCI format 2_3 for other purposes.

DCI format 0_0 may be used to schedule a transmission port (TB)-based (or TB-level) PUSCH, and DCI format 0_1 may be used to schedule the TB-based (or TB-level) PUSCH or a code block group (CBG)-based (or CBG-level) PUSCH (when CBG-based signal transmission and reception are configured).

DCI format 1_0 may be used to schedule a TB-based (or TB-level) PDSCH, and DCI format 1_1 may be used to schedule the TB-based (or TB-level) PDSCH or a CBG-based (or CBG-level) PDSCH (when the CBG-based signal transmission and reception are configured).

DCI format 2_0 may be used to notify a slot format. DCI format 2_1 may be used to notify PRB(s) and OFDM symbol(s) where a UE assumes that no transmission is intended for the UE. DCI format 2_2 may be used to transmit transmission power control (TPC) commands for the PUCCH and the PUSCH. DCI format 2_3 may be used to transmit a group of TPC commands for SRS transmission at one or more UEs.

The details of the DCI formats may be found in 3GPP TS 28.212. That is, the features of the DCI formats which are not described in the present disclosure may be found in the specification. In addition, the definitions of all terms used herein may also found in the specification.

2. Proposed Embodiments

Hereinafter, the configurations according to the present disclosure will be described in detail based on the above-described technical features.

In the NR system to which the present disclosure is applicable, a UE may report to a BS one piece of channel state information (CSI) (e.g., CSI reference signal resource indicator/rank indicator (CRI/RI), channel quality indicator (CQI), and/or precoding matrix indicator (PMI)) within a given transmission time (e.g., a slot). When the UE transmits one CSI report over a short PUCCH (e.g., a PUCCH including one or two symbols) or transmits a wideband (WB) or partial-band report (e.g., WB or partial-band CSI) over a long PUCCH (e.g., a PUCCH including four or more symbols), the UE may transmit the report by performing joint encoding of the CRI/RI, PMI, CQI, and/or zero padding bits in a given payload.

According to the present disclosure, when the UE performs subband (SB) reporting over the long PUCCH or performs CSI reporting over a PUSCH, CSI reported by the UE may be divided into two parts as follows.

Part 1: CRI/RI and CQI for first codeword (CW)
Part 2: PMI and CQI for second CW FIG. 10 is a diagram schematically illustrating a CSI omission rule applicable to the present disclosure.

Figure 10:
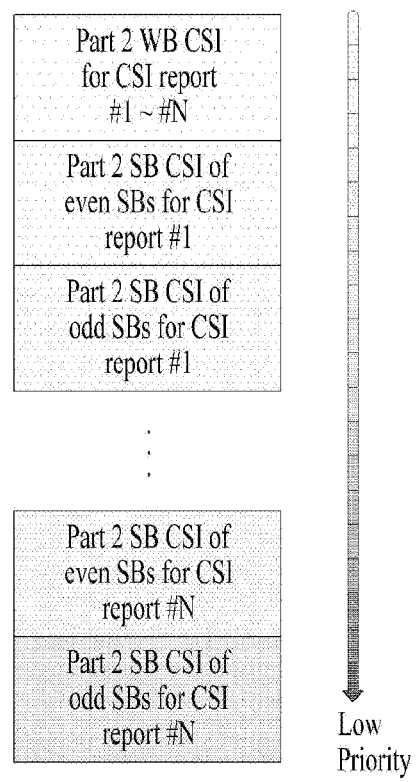
FIG. 10 is a diagram schematically illustrating a channel state information (CSI) omission rule applicable to the present disclosure.

When predetermined conditions are satisfied, the UE according to the present disclosure may perform CSI omission based on the CSI omission rule illustrated in FIG. 10.

For example, when the size of UCI for CSI reporting at the UE is greater than the size of a resource allocated by the BS to the UE for PUSCH transmission, the UE may report CSI to the BS by dropping a PMI and/or CQI of a specific SB based on the rule illustrated in FIG. 10.

For the CSI reporting on the PUSCH, CSI part 2 information bits of partial SBs may be omitted. Regarding a priority rule for omitting partial CSI part 2 information, the priority level (or priority) may decrease from box #0 to box #2N. In this case, the omission granularity (or omission basis) may be one box in FIG. 10.

In FIG. 10, N may denote the number of CSI reports in one slot, and the CSI report number may correspond to the order in the CSI report configuration.

According to the present disclosure, when the UE performs CSI reporting as described above, the UE may be configured with a PT-RS through RRC signaling. In this case, the UE may report a layer indicator (LI), which is information indicating the best layer, to the BS in order to support the BS to determine a DMRS port related to the PT-RS.

Hereinafter, a description will be given of LI reporting methods for a UE applicable to the present disclosure.

When the UE performs long PUCCH based SB reporting or PUSCH based CSI reporting, the LI, which needs to be included in the CSI, may be always included in Part 1 CSI related to WB properties (or regardless of the reporting characteristics of the UE (for example, regardless of whether it is a WB/PB or an SB)). In addition, the LI may be encoded separately from other CSI content and then reported to the BS. The reason for this is that the Part 1 CSI may contain CSI content that does not depend on the CRI/RI.

As another example, when the UE performs short PUCCH based CSI reporting or long PUCCH based WB/PB reporting, the LI may be encoded separately from other CSI content. The decoding order or UCI field order may be determined as CRI→RI→padding bit→(PMI/CQI)→LI, CRI→RI→padding bit→LI→(PMI-/CQI), or CRI→RI→padding bit→PMI→LI→CQI to improve the performance of polar coding. In this case, the (bit) size of the LI may be set to one bit (in the case of rank=2) or two bits (in the case of rank>2) according to the size of the RI.

As another example, the size of the LI may be fixed to a specific size regardless of the RI. In this case, the LI may be encoded together with the RI and then reported to the BS. The decoding order or UCI field order may be determined as CRI→RI→LI→padding bit→PMI→CQI or CRI→LI→RI→padding bit→PMI→CQI.

As another example, when the UE performs the long PUCCH based SB reporting or the PUSCH based CSI reporting, the LI may be configured to be included in the Part 1 CSI at all times due to SB properties. Thus, the LI may be encoded separately from other CSI content and then reported to the BS. In this case, joint encoding or separate encoding may be applied to the LI per SB.

As another example, when the UE performs the long PUCCH based SB reporting or the PUSCH based CSI reporting, the LI may be configured to be included in Part 2 CSI. Thus, the LI may be encoded separately from other CSI content and then reported to the BS. In this case, the following omission rules may be applied to the CSI.

1) In the case of WB CSI reporting, the LI may be encoded separately from the PMI and CQI for second CW. In this case, the LI may be mapped to the least significant bit (LSB).

2) When the LI is configured to have the WB properties and the UE is configured with SB CSI reporting, the UE may protect the LI from being omitted by configuring the LI to be included in WB CSI (i.e., the first block in FIG. 10, which has the highest priority) with respect to the omission priorities in FIG. 10. Then, the UE may report the LI to the BS.

3) When the LI is configured to have the WB properties and the UE is configured with SB CSI reporting, the entire system may operate with no significant problems even if the LI is not reported to the BS. In this case, the LI may be configured to be included in odd-numbered SB CSI of each n-th report (1<=n<=N) (see FIG. 10). Thus, the CSI omission rule may be applied to the LI.

4) When the LI is configured to have the SB properties and the UE is configured with the SB CSI reporting, the LI per SB may be configured to be included in odd-numbered SB CSI of each n-th report. Thus, the CSI omission rule may be applied to the LI.

5) The entire system may operate with no significant problems even if the LI is not reported to the BS. The LI may have the lowest priority in the CSI omission for each n-th report. That is, the LI may be configured to have a lower priority than odd-numbered SB CSI in FIG. 10.

Hereinafter, a description will be given of CSI reporting operations for a UE applicable to the present disclosure and DL PT-RS reception operations related thereto.

When two CWs are used in cyclic prefix orthogonal frequency division multiplexing (CP-OFDM) transmission, a UE may report to a BS information on a DL layer in a CW with a higher CQI (e.g., a preferred DL layer) in UCI. The information on the preferred DL layer may be reported to the BS through the LI and used for PT-RS mapping.

The LI may be configured to be separated from other CSI according to the following encoding rule of a WB PMI. The UCI field order may be determined as CRI→RI→padding bits (if present)→PMI→CQI.

In the present disclosure, the LI may be referred to as a strongest layer indicator (SLI).

In the following, a preferred layer group may refer to a layer group preferred by a UE for each transmission and reception point (TRP) to transmit a feedback signal. The layer group preferred by the UE may be equal to or different from a DMRS port group corresponding to each TRP. In the present disclosure, it is assumed that the layer group preferred by the UE has the same meaning as the DMRS port group described in specifications such as 3GPP TS 38.211, TS 38.212, TS 38.213, and TS 38.214.

In the present disclosure, the number of reporting DL PT-RS ports may refer to the number of DL PT-RS ports used by a UE for reporting. Thus, the number of reporting DL PT-RS ports may be equal to or different from the number of DL PT-RS ports configured for the UE.

However, for convenience of description, the present disclosure assumes that the number of reporting DL PT-RS ports is equal to the number of DL PT-RS ports. Thus, the number of reporting DL PT-RS ports may have the same meaning as the number of DL PT-RS ports.

Additionally, the number of reporting DL PT-RS ports may be equivalent to the number of SLIs reported by a UE. Although UE's SLI reporting may not be related to any DL PT-RS ports from the perspective of UE behavior, a BS may use SLI(s) reported by the UE for mapping between DL PT-RS ports and DMRS ports.

In the present disclosure, the size of the SLI may be determined depending on the RI. For example, the SLI size may be configured as shown in Table 8 below depending on the RI. When the SLI size varies, the size of padding bits may also vary.

TABLE 8

| RI | Bits for SLI |
|---|---|
| 1 | 0 |
| 2 | 1 |
| 3 | 2 |
| 4 | 2 |

While the sizes of the CRI and RI are fixed, the sizes of the SLI and PMI may be derived/obtained from the value of the RI. Thus, the BS may calculate the size of the padding bits after decoding the CRI and RI first and then improve decoding performance based thereon. Thereafter, the BS may decode the SLI and PMI. To this end, the SLI needs to be encoded after the padding bits. That is, in the present disclosure, the UCI field order may be determined as follows.

CRI→RI→Padding bits (if present)→SLI→PMI→CQI

Specifically, the bit size of the SLI may vary depending on the RI as described above. This may be seen from Table 8 above.

The BS may configure the SLI size for the UE through higher layer signaling (e.g., RRC signaling, medium access control-control element (MAC-CE) signaling, etc.).

Since UCI is a limited resource, the size of SLI bits included in the UCI may also be limited. For example, it is assumed in Table 8 that the maximum SLI size is fixed to 2, but the maximum SLI size may be limited to 1 in some embodiments. When the maximum SLI size is limited to 1, the SLI size may be set to one bit even in the case of RI=3 or 4. In this case, the SLI may indicate one of two layers. Here, the two layers are not limited to layers #0 and #1, and various combinations such as layers #0 and #2, layers #1 and #3, etc. may be applied in some embodiments.

In the present disclosure, when there is no related transmission configuration indication (TCI) state information in DCI received from the BS over a PDCCH (for example, when the higher layer parameter tci-PresentInDCI is set to 'disabled', i.e., when the higher layer parameter tci-PresentInDCI is not set to 'Enabled'), there may be no related TCI state information in the DCI. In this case, the UE may assume that the number of scheduled DL PT-RS ports is the same as the number of DMRS ports.

The TCI state information transmitted in the DCI may be used to configure the number of scheduled DL PT-RS ports for the UE. Thus, when PresentInDCI='Disabled' (or when there is no TCI state information in the received DCI), the UE may know the number of scheduled DL PT-RS ports.

Upon receiving the DCI where PresentInDCI='Disabled', the UE may expect (or assume) that the number of DL PT-RS ports is the same as the number of DMRS ports.

When PresentInDCI='Disabled', a plurality of DMRS port groups may not be defined for the UE. In this case, the number of DMRS port groups may be limited to 1.

Thus, upon receiving the DCI where PresentInDCI='Disabled', the UE may expect (or assume) that the number of DL PT-RS ports is 1.

Alternatively, upon receiving the DCI where PresentInDCI='Disabled', the UE may obtain the number of scheduled DL PT-RS ports from a TCI state applied to a control resource set (CORESET) currently used for PDCCH reception (or for a PDCCH carrying the DCI).

Specifically, when there is no TCI state information in DCI for a CORESET scheduling a PDSCH, the UE may assume that the TCI state for the PDSCH is equal to the TCI state applied for a CORESET used for PDCCH transmission to determine QCL information on PDSCH antenna ports.

Upon receiving the DCI where PresentInDCI='Disabled', the UE may obtain the number of DL PT-RS ports from the TCI state applied to the PDCCH carrying the DCI. For example, when the TCI state applied to the PDCCH carrying the DCI includes information on N beam resources (where N=1 or 2), the UE may recognize that the number of DL PT-RS ports is N.

In summary, a plurality of TCI states may be configured by higher layer signaling (e.g., RRC signaling), and DCI may indicate a specific TCI state among the plurality of TCI states. If a UE is not provided with the specific TCI state through the DCI, the UE may receive a PDSCH based on a TCI state applied to a CORESET used for PDCCH transmission. In addition, the UE may know the number of DL PT-RS ports based on the TCI state applied to the CORESET used for the PDCCH transmission.

In other words, when a UE receives DCI (or a PDCCH) where PresentInDCI='Disabled', the UE may operate as follows.

When the number of DL PT-RS ports is indicated as 1 by the TCI state applied to the CORESET, the UE may expect that only one PT-RS is transmitted from one or multiple DMRS port groups. That is, even though multiple DMRS port groups are configured for the UE, the UE may assume that one DL PT-RS port is scheduled (or configured).

If the TCI state applied to the CORESET includes information on a plurality of RS sets, the UE may expect that the PT-RS will be transmitted from a DMRS port group where a CW with a high modulation and coding scheme (MCS) is transmitted. In other words, the PT-RS may be transmitted to the UE from the DMRS port group where the CW with the high MCS is transmitted among the multiple DMRS port groups.

When the number of DL PT-RS ports is indicated as 2 by the TCI state applied to the CORESET, the UE may expect that the PT-RS is transmitted from each of the two DMRS port groups. That is, the UE may assume that the number of DL PT-RS ports is 2.

In the present disclosure, the number of DL PT-RS ports may be less than or equal to the number of DMRS port groups. When the number of DL PT-RS ports is equal to the number of DMRS port groups, the UE may report the SLI for each DMRS port group (or preferred layer group). On the other hand, when the number of DL PT-RS ports is less than the number of DMRS port groups, the number of SLIs reported by the UE may also be less than the number of DMRS port groups (or preferred layer groups).

In the prior art, it has not been defined how the number of DL PT-RS ports to be reported (or used for reporting) by a UE is determined. Therefore, the present disclosure proposes a method for solving such an issue. In the following, the number of DL PT-RS ports used by a UE for reporting may be referred to as the number of reporting DL PT-RS ports.

A UE may expect that the number of DL PT-RS ports is less than or equal to the number of preferred layer groups. According to the present disclosure, the UE may report to a BS an SLI for each preferred layer group regardless of the number of DL PT-RS ports. In addition, when the number of DL PT-RS ports is less than the number of preferred layer groups in DL data transmission, the BS and UE may have no ambiguity since the number of preferred layer groups is not related to the number of DL PT-RS ports.

In the present disclosure, the UE may determine the number of DL PT-RS ports defined by a TCI or a TCI state as the number of reporting DL PT-RS ports.

Specifically, the BS may preconfigure information on RS sets and information on the number of DL PT-RS ports through one piece of TCI state information to service non-coherent joint transmission (JT) operation to the UE. Thus, the UE may determine the number of DL PT-RS ports as the number of reporting DL PT-RS ports.

In other words, the UE may determine the number of reporting DL PT-RS ports from the number of DL PT-RS ports defined by the TCI state associated with reporting.

For example, in the case of aperiodic reporting, the TCI state may be indicated by DCI triggering the aperiodic reporting.

For example, in the case of aperiodic/periodic reporting, the TCI state may be preconfigured for the UE.

Meanwhile, the number of DL PT-RS ports defined by the TCI state may be changed by RRC and/or MAC-CE signaling.

To this end, the following embodiments may be considered.

When the number of reporting DL PT-RS ports is 2 and the number of DMRS port groups (or preferred layer groups) is 2, the UE may determine/select the SLI for each DMRS port group (or preferred layer group) and then feed the corresponding information back to the BS.

When the number of reporting DL PT-RS ports is 1, the number of DMRS port groups (or preferred layer groups) is 2, and there is one CW, the UE may determine/select one SLI for layers included in all DMRS port groups (or preferred layer groups) and then feed the SLI back to the BS.

When the number of reporting DL PT-RS ports is 1, the number of DMRS port groups (or preferred layer groups) is 2, and there are two CWs, the UE may select one SLI in a CW with a higher CQI and then feed the SLI back to the BS.

Alternatively, the UE may determine the number of DL PT-RS ports configured by RRC signaling as the number of reporting DL PT-RS ports.

Alternatively, the UE according to the present disclosure may define the number of reporting DL PT-RS ports based on a reporting setting based on CSI-ReportConfig, CSI resource setting based on CSI-ResourceConfig, and/or information on a measurement configuration.

In the present disclosure, joint encoding or separate encoding may be applied to SLIs corresponding to different DMRS port groups (or preferred layer groups) to feed back the SLIs to the BS. In the case of the joint encoding, bit information indicating each SLI in feedback bit information may be determined based on the rank of a corresponding DMRS port group (or preferred layer group).

For example, when the number of DMRS port groups (or preferred layer groups) is 2 and the UE reports the SLI for each group, joint-encoded bit information may be divided into the most significant bit (MSB) and the LSB. Here, the MSB and the LSB may indicate the SLI for the first DMRS port group (or preferred layer group) and the SLI for the second DMRS port group (or preferred layer group), respectively. The size of each of the MSB and LSB in the feedback bit information may be determined according to the rank of each DMRS port group (or preferred layer group).

TABLE 9

| RI | Bits for SLI |
| --- | --- |
| 1 (1, 0) | 0 |
| 2 (1, 1) | 0 |
| 3 (1, 2) | 1 (0, 1) |
| 4 (2, 2) | 2 (1, 1) |
| 5 (2, 3) | 3 (1, 2) |
| 6 (3, 3) | 4 (2, 2) |
| 7 (3, 4) | 4 (2, 2) |
| 8 (4, 4) | 4 (2, 2) |

In Table 9 above, RI=X (X1, X2) represents that the total rank is X and the ranks of DMRS port groups #1 and #2 (or preferred layer groups #1 and #2) are X1 and X2, respectively.

In Table 9 above, Bits for SLI=Y (Y1, Y2) represents that the total bit size is Y and the sizes of the MSB and LSB are Y1 [bits] and Y2 [bits], respectively.

When the ranks are given as X1 and X2, X1 and X2 may determine the sizes of the MSB and LSB, respectively. For example, when X1=2 and X2=3, the sizes of the MSB and LSB may be determined such that MSB=1 bit (Y1) and LSB=2 bits (Y2).

When the rank is given as X, the ranks of DMRS port groups (or preferred layer groups), X1 and X2 may be determined according to the CW-to-layer mapping rule shown in Table 10 below. For example, when RI=5, the sizes of the MSB and LSB may be determined such that MSB=1 bit (Y1) and LSB=2 bits (Y2).

TABLE 10

| X | X1, X2 |
| --- | --- |
| 1 | 1, 0 |
| 2 | 1, 1 |
| 3 | 1, 2 |
| 4 | 2, 2 |
| 5 | 2, 3 |
| 6 | 3, 3 |
| 7 | 3, 4 |
| 8 | 4, 4 |

The above embodiment may be efficient to non-coherent JT.

In the above embodiment, when the number of reporting DL PT-RS ports is 1, Bits for SLI may be defined as follows.

TABLE 11

| RI | Bits for SLI |
| --- | --- |
| 1 (1, 0) | 0 |
| 2 (1, 1) | 1 |
| 3 (1, 2) | 2 |
| 4 (2, 2) | 2 |
| 5 (2, 3) | 2 |
| 6 (3, 3) | 2 |

TABLE 11-continued

| RI | Bits for SLI |
|---|---|
| 7 (3, 4) | 2 |
| 8 (4, 4) | 2 |

For example, when the rank is 5 or higher, the UE may select a DL layer only within a CW with a higher CQI and then report the DL layer to the BS. Thus, the maximum size of Bits for SLI may be limited to two bits.

In this case, Bits for SLI may be interpreted as the MSB or the LSB.

According to the present disclosure, when one or more SLIs are joint-encoded and transmitted, the bit size of the SLI field (i.e., Bits for SLI) may be determined by the number of reporting DL PT-RS ports and/or the RI (i.e., X or {X1, X2}).

Alternatively, the BS may configure the presence of SLI reporting for each DMRS port group (or preferred layer group) for the UE through higher layer signaling (e.g., RRC, MAC-CE, etc.).

Specifically, each of a plurality of TCI states configured by higher layer signaling may include the presence of the SLI reporting for each DMRS port group (or preferred layer group). Thus, the BS may configure the presence of the SLI reporting for each DMRS port group (or preferred layer group) through higher layer signaling.

As another example, the presence of the SLI reporting may be configured for the UE according to the present disclosure through higher layer signaling based on a reporting setting based on CSI-ReportConfig, CSI resource setting based on CSI-ResourceConfig, and/or information on a measurement configuration.

The UE according to the present disclosure may perform CSI reporting according to the following methods.

By assuming that two CWs are transmitted from different TRPs/beams, the UE may perform the CSI reporting as follows.

When the CSI reporting is transmitted on a short PUCCH or a long PUCCH with a WB, the UE may perform joint encoding of {SLI of CW #0, SLI of CW #1} and then report the encoding result to the BS. In this case, each of the two SLIs may be fixed to two bits. That is, since the bit size of the SLI is fixed to two bits regardless of the RI, the joint encoding may be applied to the RI and the SLI.

When the CSI reporting is transmitted on a PUSCH or a long PUCCH with an SB, the UE may report the SLI of CW #0 through CSI part 1 and report the SLI of CW #1 through CSI part 2. For example, the CSI reported by the UE may be configured as follows.

Part 1: {CRI, RI, CQI of CW #0, SLI of CW #0}
Part 2: {PMI, CQI of CW #1, SLI of CW #1}

In this case, the bit size of the SLI of CW #0 may be two bits, and the bit size of the SLI of CW #1 may be determined by the rank of CW #1.

Specifically, when the rank of CW #1 is 1, the bit size of the SLI of CW #1 may be set to 0. In other words, the SLI of CW #1 may not be defined.

As another example, when the rank of CW #1 is 2, the bit size of the SLI of CW #1 may be set to 1.

As another example, when the rank of CW #1 is 3 or 4, the bit size of the SLI of CW #1 may be set to 2.

SUMMARY

Figure 11:
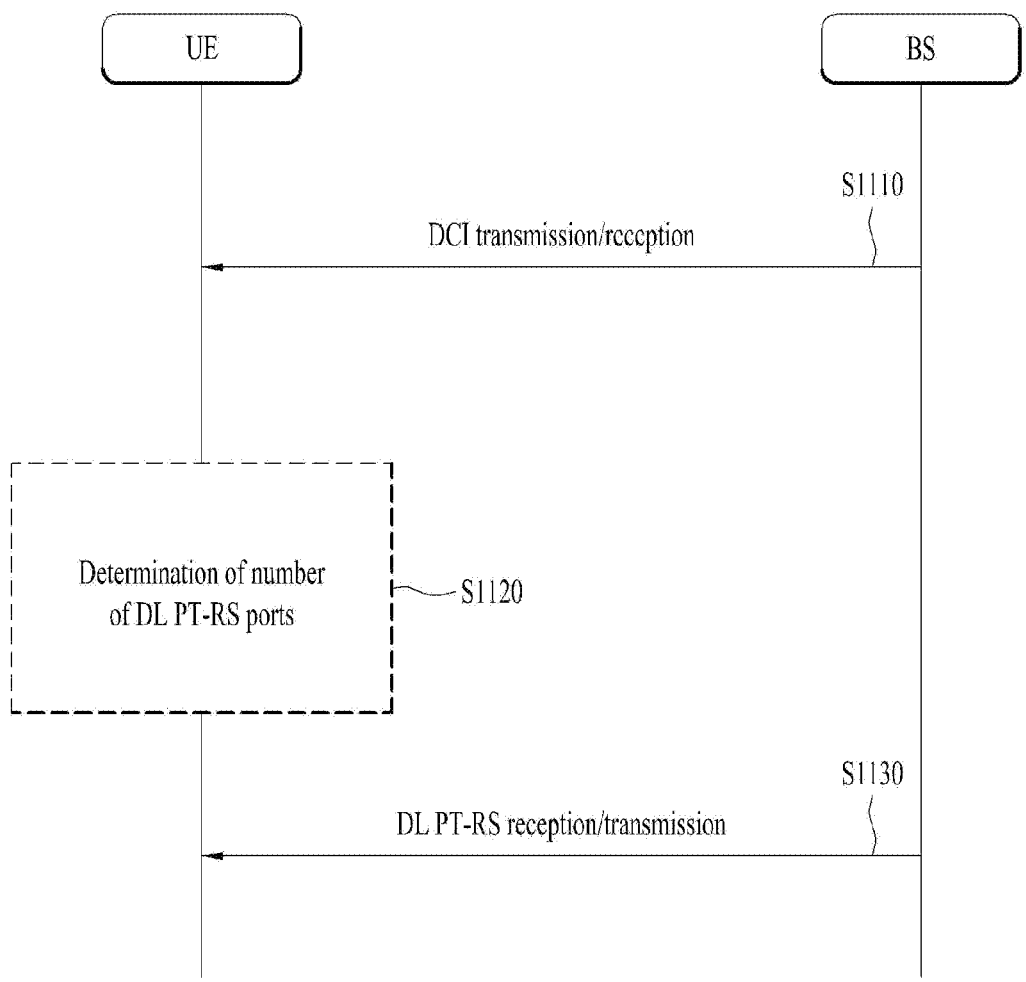
FIG. 11 is a diagram schematically illustrating a method of transmitting and receiving a PT-RS between a base station (BS) and a user equipment (UE) according to an embodiment of the present disclosure.
Figure 12:
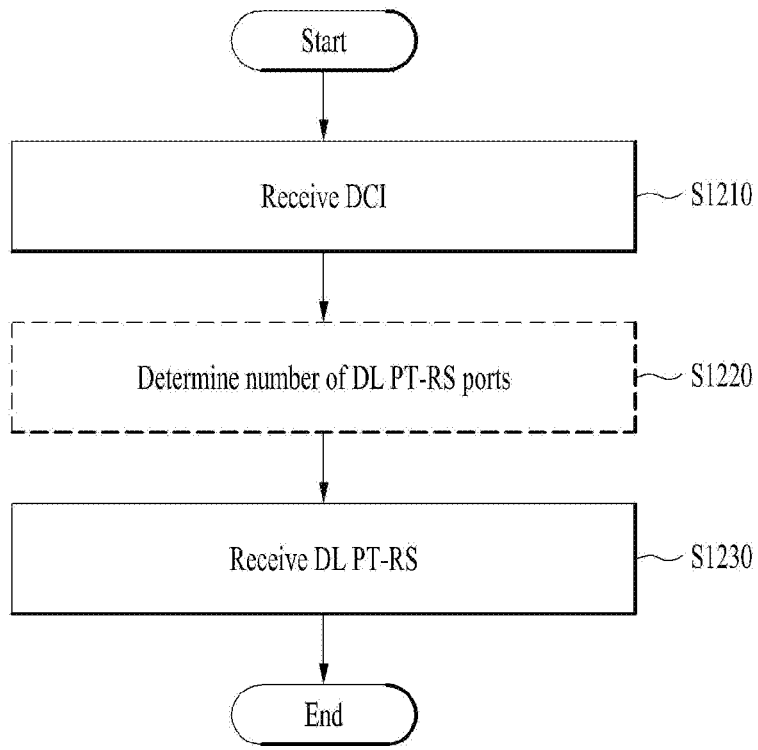
FIG. 12 is a flowchart illustrating a method for the UE to receive the PT-RS from the BS according to the present disclosure.
Figure 13:
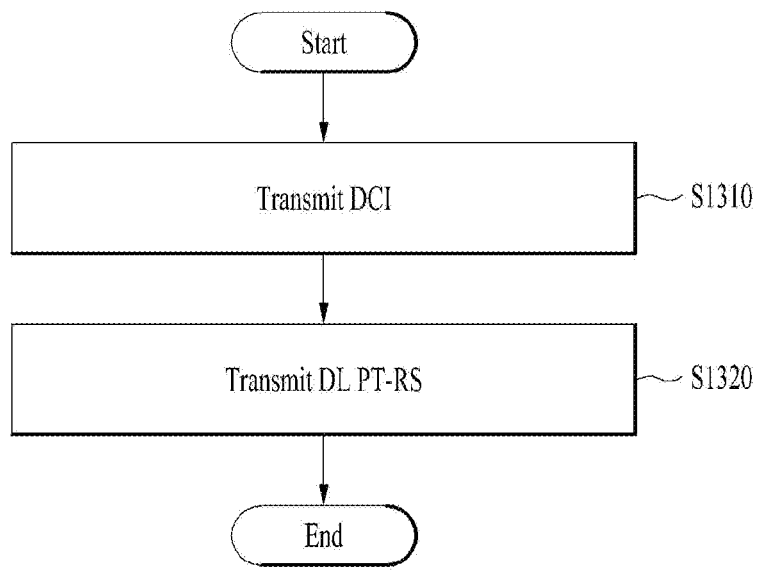
FIG. 13 is a flowchart illustrating a method for the BS to transmit the PT-RS to the UE according to the present disclosure.

FIG. 11 is a diagram schematically illustrating a method of transmitting and receiving a PT-RS between a BS and a UE according to an embodiment of the present disclosure, FIG. 12 is a flowchart illustrating a method for the UE to receive the PT-RS from the BS according to the present disclosure, and FIG. 13 is a flowchart illustrating a method for the BS to transmit the PT-RS to the UE according to the present disclosure.

The UE receives a PDCCH including DCI from the BS (S1110 and S1210). That is, the BS transmits the PDCCH including the DCI to the UE (S1110 and S1310).

The DCI may schedule transmission of a PT-RS (and DL data) from the BS to the UE. That is, based on the DCI, the UE may recognize that the scheduled PT-RS (and DL data) is transmitted from the BS.

The UE may determine the number of PT-RS ports for receiving the PT-RS (S1120 and S1220). In the present disclosure, determining, by the UE, the number of PT-RS ports may include determining the number of PT-RS ports through processing at the UE.

In this case, there may be information related to a first TCI state in the DCI or not. When the information related to the first TCI state is present in the DCI, the UE may determine the number of DL PT-RS ports scheduled for the UE based on the first TCI state. When the information related to the first TCI state is not present in the DCI, the UE may determine the number of DL PT-RS ports scheduled for the UE based on a second TCI state applied to a CORESET for receiving the PDCCH including the DCI.

In this case, the first TCI state may include configuration information on a DMRS port for the DL data scheduled by the DCI.

The UE receives the PT-RS from the BS based on the determined number of DL PT-RS ports (S1130 and S1230). That is, the BS transmits the PT-RS to the UE (S1130 and S1320). As described above, depending on whether the information related to the first TCI state is present in the DCI, the number of DL PT-RS ports for transmitting the PT-RS may be determined based on the first TCI state or the second TCI state applied to the CORESET for transmitting the PDCCH.

According to the present disclosure, when the number of DL PT-RS ports is determined as 1, the UE may receive the PT-RS from one DMRS port group among one or more DMRS port groups configured for the UE. In other words, when the determined number of DL PT-RS ports is 1, the UE may receive the PT-RS from the one DMRS port group among the one or more DMRS port groups configured for the UE.

The number of the one or more DMRS port groups configured for the UE may be equal to the number of pieces of RS set information included in the first or second TCI state.

According to the present disclosure, when the number of DL PT-RS ports is determined as 1, the UE may receive the PT-RS from one DMRS port group related to a CW with a high MCS level among a plurality of DMRS port groups configured for the UE. In other words, when the determined number of DL PT-PS ports is 1, the UE may receive the PT-RS from the one DMRS port group related to the CW with the high MCS level among the plurality of DMRS port groups configured for the UE According to the present disclosure, when the number of DL PT-RS ports is determined as 2, the UE may receive the PT-RS from each of two DMRS port groups configured for the UE. In other words, when the determined number of DL PT-PS ports is 2, the UE may receive the PT-RS from each of the two DMRS port groups configured for the UE.

In this case, a layer on which the UE receives the PT-RS from each of the DMRS port groups may be determined based on an SLI related to each of the DMRS port groups, which are reported by the UE to the BS.

To this end, the UE may perform joint encoding of SLIs related to the DMRS port groups and report the joint-encoded SLIs to the BS over a PUCCH with a length of one or two symbols or a PUCCH with a length of four or more symbols with WB reporting. In this case, each of the SLI related to a first DMRS port group and the SLI related to a second DMRS port group may be configured to have a size of two bits.

The UE may divide each of the SLI related to the first DMRS port group and the SLI related to the second DMRS port group into CSI part 1 and CSI part 2 and then report the CSI part 1 and the CSI part 2 to the BS over a PUSCH or a PUCCH with a length of four or more symbols with SB reporting. The CSI part 1 may further include a CRI and an RI, and the CSI part 2 may further include a PMI. The SLI related to the first DMRS port group may be configured to have a size of two bits, and the SLI related to the second DMRS port group may be configured to have a variable bit size depending on the rank of the second DMRS port group.

Specifically, when the rank of the second DMRS port group is 1, the SLI related to the second DMRS port group may be configured to have a size of zero bits. When the rank of the second DMRS port group is 2, the SLI related to the second DMRS port group may be configured to have a size of one bit. When the rank of the second DMRS port group is 3 or 4, the SLI related to the second DMRS port group may be configured to have a size of two bits.

Since each embodiment of the above-described proposed method may be considered as one method for implementing the present disclosure, it is apparent that each embodiment may be regarded as a proposed method. In addition, the present disclosure may be implemented not only using the proposed methods independently but also by combining (or merging) some of the proposed methods. In addition, it is possible to define a rule that information on whether the proposed methods are applied (or information on rules related to the proposed methods) should be transmitted from the BS to the UE through a predefined signal (e.g., physical layer signal, higher layer signal, etc.).

3. Device Configuration

Figure 14:
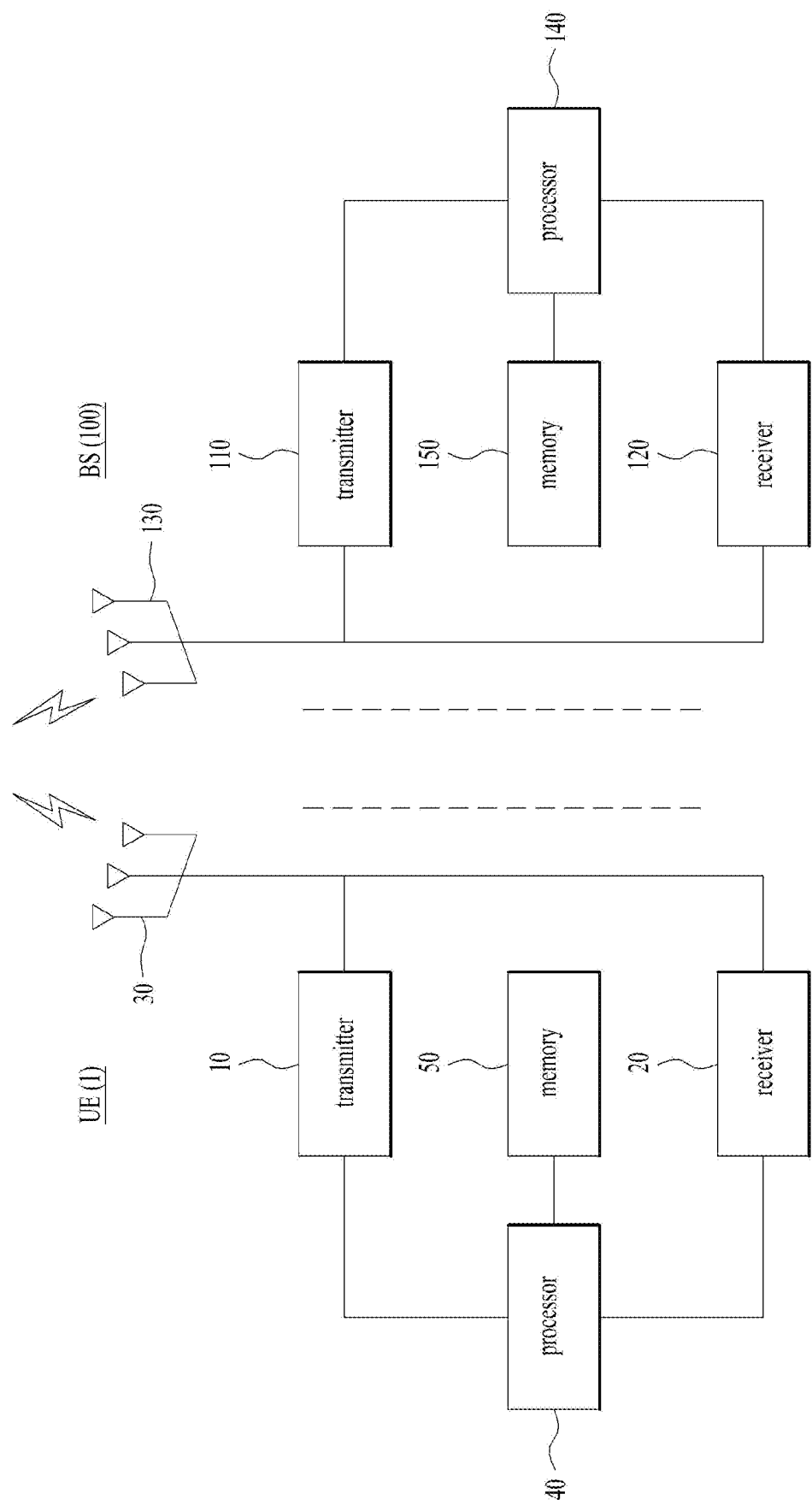
FIG. 14 is a diagram illustrating the configurations of a UE and a BS for implementing the proposed embodiments.

FIG. 14 is a diagram illustrating the configurations of a UE and a BS for implementing the embodiments proposed in the present disclosure. The UE and BS illustrated in FIG. 14 operate to implement the above-described embodiments of the DL PT-RS transmission and reception method therebetween.

The UE 1 may act as a transmission end in UL and a reception end in DL. The BS (eNB or gNB) 100 may act as a reception end in UL and a transmission end in DL.

Each of the UE and BS may include a transmitter (Tx) 10 or 110 and a receiver (Rx) 20 or 120 for controlling transmission and reception of information, data, and/or messages and an antenna 30 or 130 for transmitting and receiving information, data, and/or messages.

In addition, each of the UE and BS may include a processor 40 or 140 for implementing the above-described embodiments of the present disclosure. The processor 40 or 140 may be configured to control a memory 50 or 150, the Tx 10 or 110, and/or the Rx 20 or 120 to implement the foregoing described/proposed procedures and/or methods.

For example, the processor 40 or 140 may include a communication modem designed to implement wireless communication technologies (e.g., LTE, NR, etc.). The memory 50 or 150 may be coupled to the processor 40 or 140 and store various information related to operations of the processor 40 or 140. For example, the memory 50 or 150 may store software code including instructions for performing all or some of the processes controlled by the processor 40 or 140 or the above-described/proposed procedures and/or methods. The Tx 10 or 110 and/or the Rx 20 or 120 may be coupled to the processor 40 or 140 and transmit and/or receive a radio signal. The processor 40 or 140 and the memory 50 or 150 may be parts of a processing chip (e.g., system on chip (SoC)).

With the above configuration, the UE 1 may receive a PDCCH including DCI from the BS 100 through the Rx 20. Depending on whether information related to a first TCI state is present in the DCI, the UE 1 may determine, through the processor 40, the number of DL PT-RS ports scheduled for the UE 1 based on the first TCI state or a second TCI state applied to a CORESET for receiving the PDCCH. The UE 1 may receive a PT-RS from the BS 100 through the Rx 20 based on the determined number of DL PT-RS ports.

That is, the BS 100 may transmit the PDCCH including the DCI to the UE 1 through the Tx 110 and then transmit the PT-RS to the UE 1 through the Tx 110. In this case, depending on whether the information related to the first TCI state is present in the DCI, the number of DL PT-RS ports for transmitting the PT-RS may be determined based on the first TCI state or the second TCI state applied to the CORESET for transmitting the PDCCH.

The Tx and Rx of the UE and BS may perform a packet modulation/demodulation function for data transmission, a high-speed packet channel coding function, OFDMA packet scheduling, TDD packet scheduling, and/or channelization. Each of the UE and BS of FIG. 14 may further include a low-power radio frequency (RF)/intermediate frequency (IF) module.

Meanwhile, the UE may be any of a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smart phone, a multi-mode multi-band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which may operate in any of a mobile Internet system and other mobile communication systems (e.g. CDMA 2000, WCDMA, etc.).

The embodiments of the present disclosure may be achieved by various means, for example, hardware, firmware, software, or a combination thereof.

In a hardware configuration, the methods according to the exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. Software code may be stored in the memory 50 or 150 and executed by the processor 40 or 140. The memory may be located at the interior or exterior of the processor and transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method may also be applied to mmWave communication using an ultra-high frequency band.

The invention claimed is:

1. A method for performing channel state information (CSI) reporting by a user equipment (UE) in a wireless communication system, the method comprising:
determining information bits of CSI reports #1 to #N, N being a positive integer greater than 1; and
performing the CSI reporting on a physical uplink shared channel (PUSCH) based on the information bits of the CSI reports #1 to #N,
wherein each of the CSI reports #1 to #N includes at least wideband CSI or subband CSI,
wherein each of the CSI reports #1 to #N includes part 1 CSI, and at least one of the CSI reports #1 to #N includes a part 2 CSI,
wherein a portion of the part 2 CSI included in the at least one of the CSI reports #1 to #N is omitted based on a predefined priority order, and
wherein a layer indicator (LI) is included in a part 2 CSI of a wideband CSI of the at least one CSI report among the CSI reports #1 to #N.

2. The method of claim 1, wherein
the portion of the part 2 CSI included in the at least one of the CSI reports #1 to #N is omitted from the part 2 CSI with a lowest priority level of the predefined priority order, the predefined priority order being based on a payload of an uplink channel for the CSI reporting.

3. The method of claim 1,
wherein the part 2 CSI of the wideband CSI of the at least one of the CSI reports #1 to #N has a higher priority level than a part 2 CSI of any subband CSI in the predefined priority order.

4. The method of claim 1, wherein the part 2 CSI includes at least one of a precoding matrix indicator (PMI) or a channel quality indicator (CQI) for a second codeword.

5. The method of claim 4, wherein the LI is separately encoded with the PMI or the CQI for the second codeword.

6. A user equipment (UE) in a wireless communication system, the UE comprising:
at least one transceiver;
at least one processor; and
at least one computer memory operably connectable to the at least one processor and storing instructions that, when executed, cause the at least one processor to perform operations comprising:
determining information bits of channel state information (CSI) reports #1 to #N, N being a positive integer greater than 1; and
performing the CSI reporting on a physical uplink shared channel (PUSCH) based on the information bits of the CSI reports #1 to #N,
wherein each of the CSI reports #1 to #N includes at least wideband CSI or subband CSI,
wherein each of the CSI reports #1 to #N includes part 1 CSI, and at least one of the CSI reports #1 to #N includes part 2 CSI,
wherein a portion of the part 2 CSI included in the at least one of the CSI reports #1 to #N is omitted based on a predefined priority order, and
wherein a layer indicator (LI) is included in a part 2 CSI of a wideband CSI of the at least one CSI report among the CSI reports #1 to #N.

7. The UE of claim 6, wherein
the portion of the part 2 CSI included in the at least one of the CSI reports #1 to #N is omitted from the part 2 CSI with a lowest priority level of the predefined priority order, the predefined priority order being based on a payload of an uplink channel for the CSI reporting.

8. The UE of claim 6,
wherein the part 2 CSI of the wideband CSI of the part 2 CSI of the at least one of the CSI reports #1 to #N has a higher priority level than a part 2 CSI of any subband CSI in the predefined priority order.

9. The UE of claim 6, wherein the part 2 CSI includes at least one of a precoding matrix indicator (PMI) or a channel quality indicator (CQI) for a second codeword.

10. The UE of claim 9, wherein the LI is separately encoded with the PMI or the CQI for the second codeword.

11. The UE of claim 6,
wherein the UE is configured to communicate with at least one of another UE, a UE related to an autonomous driving vehicle, a base station, or a network.

12. An apparatus for a user equipment (UE), the apparatus comprising:
at least one processor; and
at least one computer memory operably connectable to the at least one processor and storing instructions that, when executed, cause the at least one processor to perform operations comprising:
determining information bits of CSI reports #1 to #N, N being a positive integer greater than 1; and
performing the CSI reporting on a physical uplink shared channel (PUSCH) based on the information bits of the CSI reports #1 to #N,
wherein each of the CSI reports #1 to #N includes at least wideband CSI or subband CSI,
wherein each of the CSI reports #1 to #N includes part 1 CSI, and at least one of the CSI reports #1 to #N includes part 2 CSI,
wherein a portion of the part 2 CSI included in the at least one of the CSI reports #1 to #N is omitted based on a predefined priority order, and wherein a layer indicator (LI) is included in a part 2 CSI of the wideband CSI of the at least one CSI report among the CSI reports #1 to #N.

* * * * *